US010533715B2

(12) United States Patent
Strölin

(10) Patent No.: US 10,533,715 B2
(45) Date of Patent: Jan. 14, 2020

(54) FIRST-FAILURE-SAFE SURGICAL LIGHT

(71) Applicant: KARL LEIBINGER MEDIZINTECHIK GMBH & CO. KG, Muehlheim (DE)

(72) Inventor: Joachim Strölin, Rietheim (DE)

(73) Assignee: Karl Leibinger Medizintechik GmbH & Co., Muehlheim (DE)

( * ) Notice: Subject to any disclaimer, the term of this patent is extended or adjusted under 35 U.S.C. 154(b) by 33 days.

(21) Appl. No.: 15/305,731

(22) PCT Filed: Mar. 25, 2015

(86) PCT No.: PCT/EP2015/056428
§ 371 (c)(1),
(2) Date: Oct. 21, 2016

(87) PCT Pub. No.: WO2015/165655
PCT Pub. Date: Nov. 5, 2015

(65) Prior Publication Data
US 2017/0328529 A1    Nov. 16, 2017

(30) Foreign Application Priority Data

Apr. 28, 2014  (EP) .................................... 14166196

(51) Int. Cl.
*F21S 8/04*       (2006.01)
*F21S 9/02*       (2006.01)
(Continued)

(52) U.S. Cl.
CPC . *F21S 8/04* (2013.01); *F21S 9/02* (2013.01); *F21V 21/28* (2013.01); *F21V 23/002* (2013.01);
(Continued)

(58) Field of Classification Search
CPC .............................................. F21W 2131/205
See application file for complete search history.

(56) References Cited

U.S. PATENT DOCUMENTS 5,808,680 A     9/1998  Steckhan
2002/0191389 A1  12/2002  Hill
(Continued)

FOREIGN PATENT DOCUMENTS

CN    201448722 U     5/2010
EP    2708802 A1     9/2012
(Continued)

OTHER PUBLICATIONS

EP Extended European Search Report in EP14166196.7 dated Oct. 28, 2016 and English translation.
(Continued)

*Primary Examiner* — Anh T Mai
*Assistant Examiner* — Zachary J Snyder
(74) *Attorney, Agent, or Firm* — Eversheds Sutherland (US) LLP

(57) ABSTRACT

The present application relates to a surgical light for illuminating an operating area, including a housing-like light body that accommodates at least a first and a second light unit and including a first power supply line that is electrically connected to the first light unit in order to feed electric current from a first voltage source to at least one light source of the first light unit, wherein the second light unit of the light body has at least one further light source and is connected to a second power supply line, that is separate from the first power supply line, by means of which second power supply line a second voltage source can be electrically connected to the second light unit.

13 Claims, 1 Drawing Sheet

(51) Int. Cl.
  *F21V 21/28* (2006.01)
  *F21V 23/00* (2015.01)
  *H02J 9/06* (2006.01)
  *F21W 131/205* (2006.01)

(52) U.S. Cl.
  CPC ........ H02J 9/065 (2013.01); *F21W 2131/205* (2013.01)

(56) References Cited

U.S. PATENT DOCUMENTS

| | | | | |
|---|---|---|---|---|
| 2004/0109331 | A1* | 6/2004 | Brukilacchio | F21V 14/04 362/572 |
| 2011/0079697 | A1* | 4/2011 | Muller | F16M 11/08 248/323 |

FOREIGN PATENT DOCUMENTS

| | | |
|---|---|---|
| EP | 2708802 | 3/2014 |
| EP | 2708802 A1 | 3/2014 |
| JP | 59 127614 U | 8/1984 |
| JP | S59127614 U | 8/1984 |
| JP | 2003000616 A2 | 7/2003 |
| JP | 2011060718 A2 | 3/2011 |
| RU | 2 218 677 C2 | 12/2003 |
| WO | 03040609 A1 | 5/2003 |

OTHER PUBLICATIONS

International Search Report dated Jun. 4, 2015 for PCT/EP2015/056428.
Office Action, 104RU-02, dated Sep. 12, 2018 (in Russian) (3 pp.).
Office Action, 104RU-02, dated Sep. 12, 2018 (English translation) (3 pp.).
First Office Action, CN 2015-800348826, dated Jul. 30, 2018 (with English translation) (8 pp.).
Notice of Reasons for Rejection, JP 2016-563951, dated Sep. 4, 2018 (with English translation) (6 pp.).
Search Report, CN 2015-800348826, dated Jul. 19, 2018 (with English translation) (4 pp.).
Search Report for CN201580034882.6, dated Feb. 12, 2019 (in Chinese with copy of English translation) (4 pp.).
Second Office Action for CN201580034882.6, dated Feb. 25, 2019 (in Chinese with copy of English translation) (9 pp.).
Decision to Grant a Patent for an Invention, Russian Patent App. No. 2016146398/07(074481), dated Feb. 4, 2019 (in Russian) (7 pp.).
Decision to Grant a Patent for an Invention, Russian Patent App. No. 2016146398/07(074481), dated Feb. 4, 2019 (in English) (7 pp.).

* cited by examiner

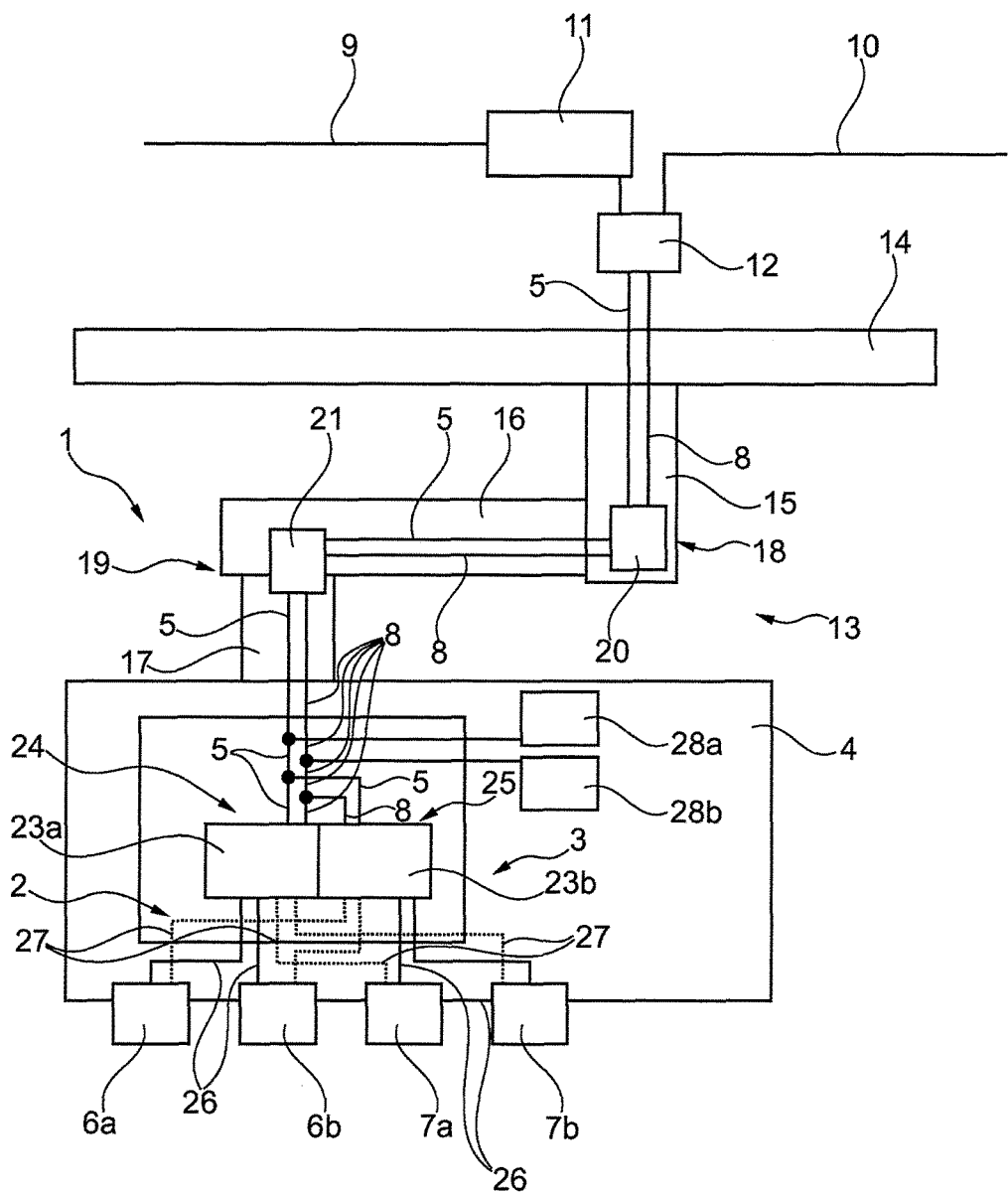

FIRST-FAILURE-SAFE SURGICAL LIGHT

TECHNICAL FIELD

The invention relates to a surgical light for illuminating an operating area, comprising a housing-like light body/light housing which accommodates at least a first and a second light unit and comprising a first power supply line which is electrically connected to the first light unit in order to feed electric current from a first voltage source to at least one light source of the first light unit.

BACKGROUND OF THE INVENTION

Surgical lights of this type are disclosed in prior art already. For example, a prior art document is known to applicant which is published under the publication number EP 2 708 802 A1 and was originally filed with the European Patent Office as European patent application EP 121 84 617, which describes a surgical light comprising a light body. In said light body at least one light module for lightening an operating area is installed. An extension component which is also arranged on the light body includes a mounting area for being fastened on a wall or on wheels, wherein at least one accumulator is arranged in at least one portion of the surgical light on the side of the light body when viewed from the mounting area.

In said prior art an undesired failure of the surgical light may happen to occur under certain circumstances, however. Especially when during surgery there is no mains voltage applied to the surgical light and the accumulator is quickly discharged, a complete failure of the light is threatening, wherefrom in turn considerable risks for the person to be treated beneath the surgical light will occur.

SUMMARY OF THE INVENTION

Therefore it is the object of the present invention to render surgical lights more fail-safe especially for a first fault.

A first fault in this case may be a breakdown of the first power supply line inside or outside of the surgical light, a fault in a coupling element deflecting the power supply line, a failure of a fuse, a light source, a fault in insulation, a fault in electronic components of the surgical light or detachment of the connecting line to the surgical light.

The object according to the invention is achieved in that the second light unit of the light body includes at least one further light source and is connected to a second power supply line, which is separate from the first power supply line, by means of which second power supply line a second voltage source can be electrically connected to the second light unit.

Via said second power supply line each light unit can be connected to a separate power source which is basically present in hospitals. In service of the surgical light one of the light units of the surgical light is always supplied with power, even if either of the two fails. In this way the failure safety of the complete surgical light is considerably increased and even in the case of quite long-lasting failure of a voltage source connected to the first power supply line safeguarded operation of the surgical light is enabled. Since the two power supply lines which supply the respective light unit are separate from/independent of each other, the surgical light is still functioning, even if one power supply line fails. In this way the risk of error when treating a patient who is placed beneath the surgical light is substantially reduced.

Further advantageous configurations are claimed in the subclaims and will be illustrated in detail hereinafter.

According to a further embodiment, it is advantageous when the light body is connected to a translationally and/or rotationally movable retaining arm system, the retaining arm system preferably including a ceiling-side and/or wall-side fastening area, wherein inside the retaining arm system the first power supply line and/or the second power supply line is/are guided. In this way simple integration of both power supply lines in the surgical light is possible.

It is moreover advantageous when the retaining arm system includes plural retaining portions which are preferably inclined relative to each other and are movable relative to each other, wherein at least a first retaining portion is arranged to be rotatable relative to a second retaining portion by means of a pivot joint.

In this context, it is useful when the first power supply line includes an electrically conductive coupling element in the area of the pivot joint and/or the second power supply line includes an electrically conductive coupling element in the area of the pivot joint. The coupling element preferably is a pivot connector or consists of at least one slip ring, thus causing each power supply line to be guided in the retaining arm system in a kink-proof manner. Hence the guiding of the two power supply lines within the retaining arm system as well as within the surgical light is further improved.

It is also expedient when the first power supply line is a three-pole design (i.e. when the first power supply line includes three strands/conductors (positive/negative-ground). Also the second power supply line preferably is a three-pole design (comprising three strands/conductors (positive/negative-ground). In this way an especially efficient power supply is provided.

When a first control electronics area including a processor is electrically connected to the first power supply line (and preferably also to the second power supply line), the control of the first light unit connected to the first power supply line can further be directly controlled.

In this context, it is also advantageous when a second control electronics area including a processor is electrically connected to the second power supply line (and preferably also to the first power supply line), which enables also the second light unit connected to the second power supply line to be preferably directly controlled.

Moreover it is of advantage when the first control electronics area and the second control electronics area are arranged on a common printed circuit board. This renders the constructed space of the two control electronics areas by far more compact. As an alternative, also each of the first and second control electronics areas may be configured on a separate printed circuit board, however, wherein in this case the individual control electronics areas could be separated in space, which allows the failure safety to be further increased.

It is furthermore advantageous when the first control electronics area and the second control electronics area are integrated in the light body. In this way the surgical light could be designed to be even more compact.

When the processor of the first control electronics area and/or the processor of the second control electronics area is/are electrically connected to the at least one light source of the first light unit and/or electrically connected to the at least one light source of the second light unit, the processor can control the light source(s) of the respective light unit directly, for example the switching on and off.

In this context, it is also advantageous when the processor of the first control electronics area is a slave processor or a master processor and/or the processor of the second control electronics area is a slave processor or a master processor. Then the control is even further improved. When the processor of the first control electronics area is a master processor, for example, the processor of the second control electronics area preferably is designed as a slave processor. When, more preferably, the processor of the first control electronics area is a slave processor, the processor of the second control electronics area is a master processor.

It is also expedient when the first power supply line is prepared (preferably including a terminal) for the connection to a first voltage source such as a mains voltage source (generating A.C. or D.C. voltage between 100 and 250 volts) or an emergency power supply source or a safety extra-low voltage (SELV) source (generating A.C. or D.C. voltage between 12 and 60 volts). Then the surgical light can be connected to the common power lines already existing/integrated in operating rooms and can be protected against short-circuit. In this way, especially the structure is further simplified, which results, above all, in a reduction of the manufacturing costs.

In this context, it is also advantageous when the second power supply line is prepared for the connection to a second voltage source such as a mains voltage source (generating A.C. or D.C. voltage between 100 and 250 volts) or an emergency power supply source or a safely extra-low voltage source (generating A.C. or D.C. voltage between 12 and 60 volts). In this way, also the second power supply line can be connected to the already existing mains in the operating room.

It is further possible to connect the two power supply lines via a joint switch-over device/switch-over to the first and second voltage sources. Such switch-over would be connected, for example, via a terminal of each power supply line to the surgical light and enables quick switchover in the case of failure of one voltage source. In this way, failure safety is further improved.

In addition, it is advantageous when at least one accumulator is connected to the first power supply line and/or to the second power supply line, with the at least one accumulator being preferably arranged in the light body. This allows for additional failure safety. For example, both power supply lines are connected to the same accumulator or, especially preferred, each of the two power supply lines is connected to a separate accumulator.

The at least one accumulator or the two accumulators then would both be accommodated in the light body in a further preferred manner so as to realize a compact design of the surgical light.

These and other features and improvements of the present application and the resultant patent will become apparent to one of ordinary skill in the art upon review of the following detailed description when taken in conjunction with the several drawings and the appended claims.

BRIEF DESCRIPTION OF THE DRAWING

Hereinafter the invention will be illustrated in detail by way of a FIGURE with plural embodiments being illustrated.

The only FIG. 1 shows a schematic representation of a surgical light according to the invention in accordance with a preferred (first) embodiment, wherein especially the arrangement and the connections of the two power supply lines inside the surgical light are illustrated.

The FIGURE is merely schematic and serves exclusively for the comprehension of the invention. Identical elements are provided with the same reference numerals.

DETAILED DESCRIPTION

FIG. 1 represents a surgical light 1 according to the invention in accordance with a first embodiment. The surgical light 1 is schematically represented, wherein especially the internal circuitry and wiring are visible. The surgical light 1 serves for illuminating an operating area not shown in detail here for the sake of clarity, i.e. the area in which a patient is treated and/or undergoes surgery. The surgical light 1 includes a light body 4 having a first light unit 2 and a second light unit 3. The two light units 2 and 3 are accommodated and held inside the housing-like light body 4. The surgical light 1 further includes a first power supply line 5 which is electrically connected to the first light unit 2 and thus serves for feeding electric current from a first voltage source not shown in detail for the sake of clarity to at least one light source 6a, 6b of said first light unit 2. The second light unit 3 of the light body 4, too, includes at least one further light source 7a, 7b, viz. plural light sources 7a, 7b, and in turn is connected to be electrically conductive to a second power supply line 8 configured separately from the first power supply line 5. The second power supply line 8 constitutes an electric connection of a second voltage source not shown in detail for the sake of clarity to the second light unit 3.

The first power supply line 5 moreover is prepared so that it can be connected to the first voltage source. A first voltage source is preferably configured as a mains voltage source generating A.C. or D.C. voltage between 100 and 250 volts, further preferred as an emergency power supply source or even more preferred as a safety extra-low voltage source generating A.C. or D.C. voltage between 12 and 60 volts. The first voltage source usually can be connected to the first power supply line 5 of the surgical light 1 by means of at least a first in-house power supply line 9. The second power supply line 8 in turn is prepared for connection to at least a second in-house power supply line 10, the second in-house power supply line 10 being connected in turn to the second voltage source which is separate from the first voltage source. The second voltage source is equally configured preferably as a mains voltage source generating A.C. or D.C. voltage between 100 and 250 volts or further preferred as an emergency power supply source or, further preferred, as a safety extra-low voltage source generating A.C. or D.C. voltage between 12 and 60 volts. Both the first and the second in-house power supply lines 9, 10 are supply lines which are provided already in the existing hospital system. In this way, in the hospital and in the respective operating room in which the surgical light 1 has to be installed already two independent in-house power supply lines 9 and 10 are provided in order to make available two current/voltage supplies existing independently of each other in the case of failure of either of the two voltage sources.

As is further evident, in the first in-house power supply line 9 a switch-mode power supply (SNT) 11 is integrated and wired with said line 9. Alternatively, said switch-mode power supply 11 may also be in the form of a transformer.

The first in-house power supply line 9 as well as the second in-house power supply line 10 are alternately/optionally electrically connected and coupled to the surgical light 1 (in service of the surgical light 1) by means of a switch-over device 12 which is adapted to be integrated in the surgical light 1 but in this embodiment is part of the operating room. The switch-over device 12 is configured so that in service the respective active voltage source (first or second voltage source) is electrically connected to both power supply lines 5 and 8. Each of the first power supply line 5 and the second power supply line 8 is connected to the switch-over device 12 by means of terminals not shown in detail here for clarity's sake.

In the case of breakdown/failure of the first voltage source the switch-over device 12 automatically switches from the first in-house power supply line 9 to the second in-house power supply line 10, thus ensuring continued supply with power (electrical energy) of both the first power supply line 5 and the second power supply line 8.

In the shown embodiment, the surgical light 1 is a ceiling light connecting the light body 4 via a retaining arm system 13 to a ceiling 14 of the operating room. The ceiling 14 in FIG. 1 is schematically represented as a longitudinal beam. The retaining arm system 13 includes plural retaining portions 15, 16, 17 which are rotational/pivoting and translational/displaceable relative to each other.

A first retaining portion 15 of the retaining arm system 13 can be/is fastened directly to the ceiling 14 by means of fasteners such as screws not shown in detail here. The first retaining portion 15 substantially extends/is orientated with its longitudinal direction (viewed according to FIG. 1) in the vertical direction and is connected to a third retaining portion 17 via a second retaining portion 16. The first retaining portion 15 is connected to the second retaining portion 16 by means of a first pivot joint 18, thus causing the second retaining portion 16, which in FIG. 1 extends substantially horizontally/is orientated horizontally with its longitudinal direction, to be rotationally movable relative to the first retaining portion 15 which extends vertically in FIG. 1. The third retaining portion 17 which in turn is connected to the second retaining portion 16 by means of a second pivot joint 19 is rotationally movable relative to the second retaining portion 16. The third retaining portion 17 in this embodiment is directly tightly connected to the light body 4; however it is alternatively also possible to provide further arm-shaped retaining portions as they are configured by the retaining portions 15 to 17 and to arrange them between the third retaining portion 17 and the light body 4.

The three retaining portions 15, 16 and 17 are designed for guiding the first and second power supply lines 5, 8. For this purpose, the retaining portions 15, 16 and 17 include a cavity extending centrally in the longitudinal direction. In said cavity/interior each of the two power supply lines 5 and 8 is arranged and guided. In the area of the respective pivot joint 18, 19 the first power supply line 5 and the second power supply line 8 are deflected and split by means of coupling elements which are configured as rotary connectors and are schematically shown here.

The first power supply line 5 is deflected by means of a first rotary connector unit in which the first rotary connector is integrated. A first line portion of the first power supply line 5 which is adjacent to the first rotary connector on a side facing away from the light body 4 is electrically connected via the first rotary connector to a second line portion of the first power supply line 5 which second line portion is adjacent to the first rotary connector in the direction of the second rotary joint 19. The first and second line portions therefore can be rotated relative to each other.

A second rotary connector of the first rotary connector unit 20 in turn is provided for deflecting the second power supply line 8. A first line portion of the second power supply line 8 is connected to said second rotary connector on a side facing away from the light body 4 and a second line portion of the second power supply line 8 is connected to the second pivot joint 19 in the direction of the second pivot joint 19. In this way, the first and second line portions of the second power supply line 8 in turn can be rotated relative to each other. The first rotary connector unit 20 is arranged inside the pivot joint 18 which enables an especially compact design.

In the second pivot joint 19 again a second rotary connector unit 21 is arranged which is designed just as the first rotary connector unit 20 and again deflects two portions (the second line portion and a third line portion) of each of the first and the second power supply lines 5 and 8 rotatably relative to each other.

As an alternative to the rotary connectors of the rotary connector units 20, 21 forming the coupling element, it is also possible to design said rotary connector units 20, 21 as slip ring units, wherein two respective slip rings then are arranged to be rotatable relative to each other and are arranged as an electric connecting element in the respective first or second power supply line 5, 8.

Each of the power supply lines 5 and 8 is a three-pole design and includes a positive cable, a negative cable and a ground cable.

Apart from the rotational movement of the three retaining portions 15 to 17 relative to each other, the retaining portions 15 to 17 are also translationally displaceable relative to each other, wherein the respective power supply lines 5 and 8 are arranged within the retaining portions 15 to 17 while forming plural loops (not shown here for clarity's sake) so that the power supply lines 5 and 8 are extendible and retractable/variable in length.

As is further clearly visible from FIG. 1, both power supply lines 5 and 8 are electrically connected to control electronics 22, viz. a printed circuit board. The control electronics 22 includes a first processor 23a in a first control electronics area 24 and includes a second processor 23b in a second control electronics area 25. As an alternative to the configuration of the two control electronics areas 24 and 25 on a printed circuit board, it is also possible to arrange the respective control electronics areas 24 and 25 on separate control electronics/printed circuit boards.

The first processor 23a of the first control electronics area 24 is a slave processor. Alternatively, it may also be a master processor, when the second processor 23b of the second control electronics area 25 is a slave processor. The second processor 23b in turn is a master processor, but it may also be a slave processor, if the first processor 23a of the first control electronics area 24 is a master processor.

The first power supply line 5 is connected to be electrically conductive to the first processor 23a. The second power supply line 8 is connected to be electrically conductive to the second processor 23b. In the embodiment according to FIG. 1, the first power supply line 5 further is in redundant connection again with the second processor 23b, too. Also the second power supply line 8 is in redundant connection with the first processor 23a. This ensures redundant supply of the two processors 23a and 23b and even in the case of failure of a power supply line the operation of both processors is possible. The first processor 23a of the first control electronics area 24 is connected to be electrically conductive to plural, viz. two, light sources 6a and 6b as is marked by the continuous connecting lines 26. Each of the light sources 6a, 6b preferably is a LED lamp. As an alternative to this, it is also possible, however, to design each of the light sources as an array of LED. In addition, not only two first light sources 6a and 6b but also definitely more, i.e. more than two light sources 6a, 6b, are connected to the first processor 23a.

The second processor 23b is connected to be electrically conductive to the first light source 7a and to the second light source 7b of the second light unit 3 via connecting lines 26 (shown by a continuous line) and consequently feeds electrical energy to the light sources 7a, 7b. These light sources 7a and 7b, too, are again designed as LED or as a LED array, with the second light unit 3 preferably including more than two light sources 7a and 7b.

Alternatively, as indicated by the connecting lines 27 shown in broken lines, the first light source 6a and the second light source 6b of the first light unit 2 may be simultaneously in redundant connection with the second processor 23b, apart from the connection with the first processor 23a. In addition, as equally indicated by the connecting lines 27 shown in broken lines, in this alternative also the two light sources 7a and 7b of the second light unit 3 are in electrically conductive connection both with the second processor 23b and, redundantly, with the first processor 23a.

The respective light sources 6a, 6b and 7a, 7b are fixedly placed/held/fastened in the housing-like light body 4. The first light unit 2 comprises the light sources 6a and 6b, the connecting lines 26 (connecting lines 26 and 27 in the alternative configuration as shown by the broken lines) as well as the first control electronics area 24 including the first processor 23a. The second light unit 3 in turn comprises the light sources 7a and 7b, the two connecting lines 26 (connecting lines 26 and 27 in the alternative configuration as shown by the broken lines) as well as the second control electronics area 25 including the second processor 23b.

There are equally provided in the light body 4 second accumulators 28a and 28b serving as additional backup of the power supply. A first accumulator 28a is in electrically conductive connection with the first power supply line 5 and is supplied with current and charged, where necessary, upon electric supply of the first power supply line 5 by the first or second voltage source. In case that both voltage sources might fail, the first accumulator 28a then serves as a supply element for operating the first and/or second processor 23a and 23b in order to continue operating the light sources 6a, 6b and/or 7a, 7b. Furthermore, a second accumulator 28b is provided which in turn is in electrically conductive connection with the second power supply line 8. Upon electric supply of the second power supply line 8 by the first or second voltage source said second accumulator 28b is in turn supplied with current and charged, where necessary. In a rare case, if both voltage sources might fail, said second accumulator 28b may serve as a supply unit and may supply both the first and the second processor 23a and 23b with current in order to equally continue operating the light sources 6a, 6b and/or 7a, 7b. In this way, a uniform accumulator system for redundant supply of the two processors 23a and 23b is provided. As an alternative to the configuration by means of the two accumulators 28a and 28b, it is also possible, however, to supply the two power supply lines 5 and 8 only by a joint accumulator which then would be electrically connected to both power supply lines 5 and 8.

The two accumulators 28a and 28b are accommodated and fastened/integrated within the housing-like light body 4 (also referred to as housing/light housing).

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

I claim:

1. A surgical light for illuminating an operating area, comprising a single translationally and/or rotationally movable retaining arm which retaining arm has a first end for being mounted on a ceiling and a second end being remote from the first end and being connected with the first end by a plurality of retaining arm portions being translationally and/or rotationally movable with respect to each other, a light housing being attached to the second end of the retaining arm and accommodating at least a first and a second light unit, and a first power supply line which is electrically connected to the first light unit in order to feed electric current from a first voltage source to at least one light source of the first light unit, wherein the second light unit of the light housing has at least one further light source and is connected to a second power supply line, which is separate from the first power supply line, by means of which second power supply line a second voltage source can be electrically connected to the second light unit, and wherein each of the first power supply line and second power supply line runs inside the retaining arm continuously from the first end to the second end and into the housing.

2. The surgical light according to claim 1, wherein at least a second retaining portion is arranged to be rotatable relative to a first retaining portion by means of a pivot joint.

3. The surgical light according to claim 2, wherein the first power supply line includes an electrically conductive coupling element in the area of the pivot joint and/or the second power supply line includes an electrically conductive coupling element in the area of the pivot joint.

4. The surgical light according to claim 1, wherein the first power supply line is a three-pole design.

5. The surgical light according to claim 1, wherein the second power supply line is a three-pole design.

6. The surgical light according to claim 1, wherein a first control electronics area including a processor is electrically connected to the first power supply line.

7. The surgical light according to claim 1, wherein a second control electronics area including a processor is electrically connected to the second power supply line.

8. The surgical light according to claim 7, wherein the first control electronics area and the second control electronics area are arranged on a joint printed circuit board and/or the first control electronics area and the second control electronics area are integrated in the light housing.

9. The surgical light according to claim 7, wherein the processor of the first control electronics area and/or the processor of the second control electronics area is/are electrically connected to the at least one light source of the first light unit and/or is/are electrically connected to the at least one light source of the second light unit.

10. The surgical light according to claim 7, wherein the processor of the first control electronics area is a slave processor or a master processor and/or the processor of the second control electronics area is a slave processor or a master processor.

11. The surgical light according to claim 1, wherein the first power supply line is prepared for being connected to the first voltage source such as a mains voltage source or an emergency power supply source or a safety extra-low voltage source.

12. The surgical light according to claim 1, wherein the second power supply line is prepared for being connected to the second voltage source such as a mains voltage source or an emergency power supply source or a safety extra-low voltage source.

13. The surgical light according to claim 1, wherein at least one accumulator is connected to the first power supply line and/or to the second power supply line, wherein the at least one accumulator is preferably arranged within the light housing.

* * * * *